H. W. MILLER.
TRAP.
APPLICATION FILED FEB. 23, 1911.
998,256.
Patented July 18, 1911.
2 SHEETS—SHEET 1.
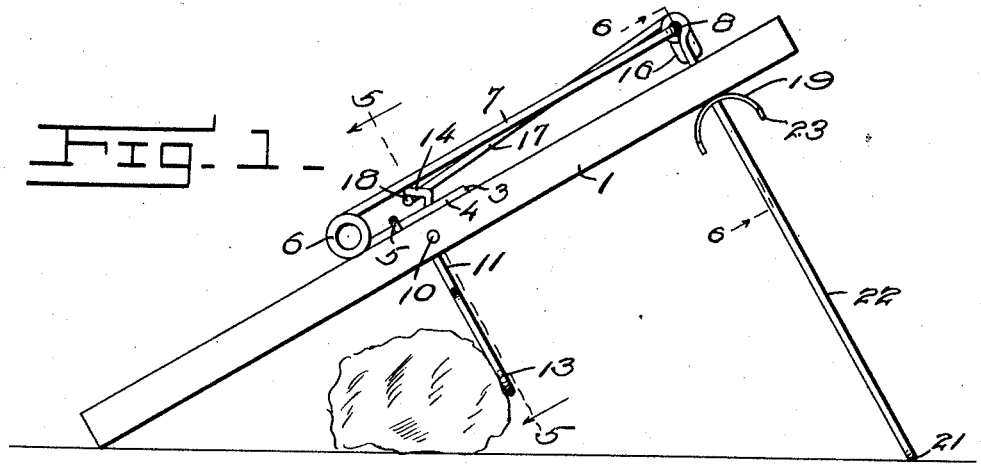
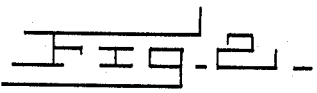
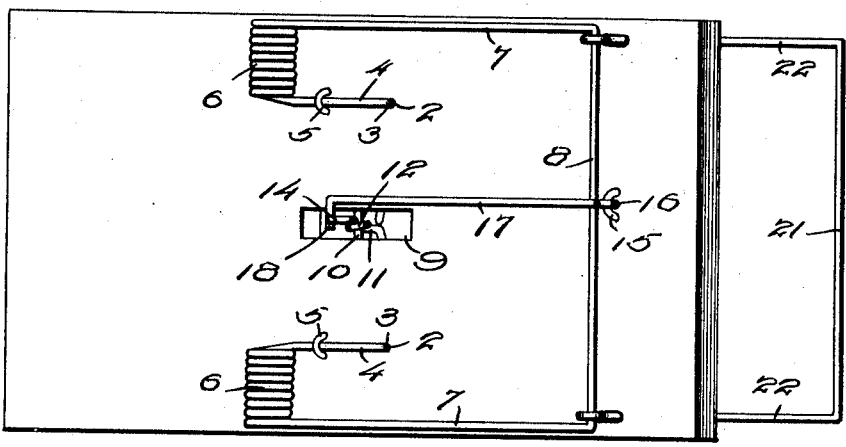
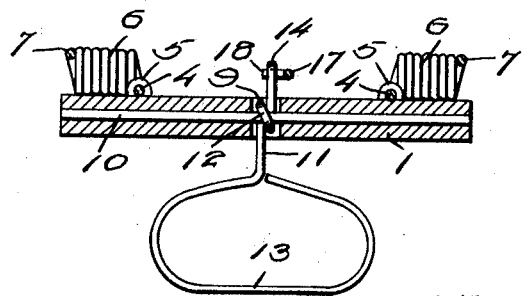
Witnesses
Inventor
H. W. Miller,
By Harry Ellis Chandlee
Attorney
COLUMBIA PLANOGRAPH CO., WASHINGTON, D. C.

H. W. MILLER.
TRAP.
APPLICATION FILED FEB. 23, 1911.
998,256.
Patented July 18, 1911.
2 SHEETS—SHEET 2.
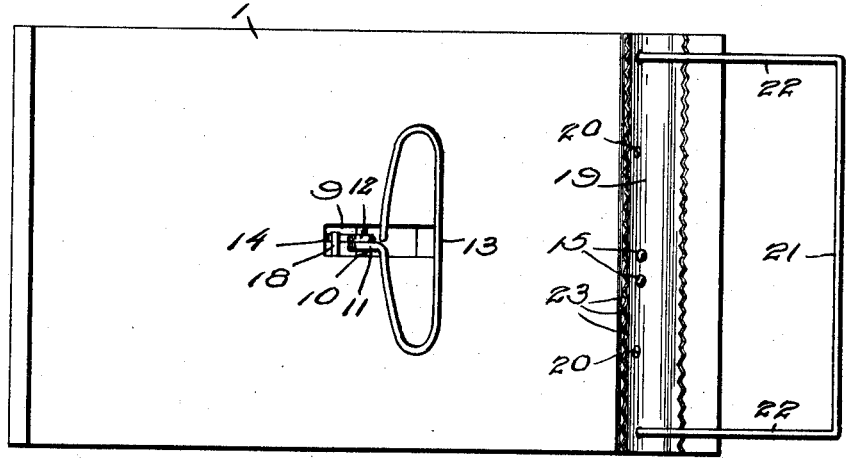
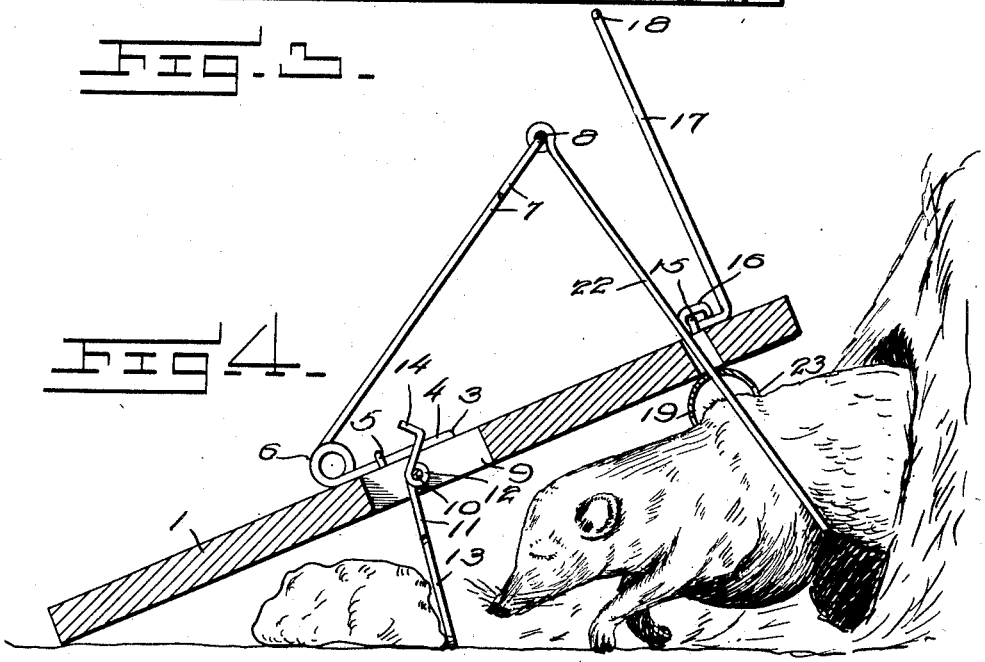
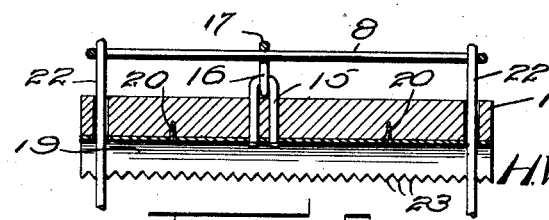
Witnesses
Inventor
H. W. Miller
By Harry Ellis Chandlee
Attorney

UNITED STATES PATENT OFFICE.

HARVEY W. MILLER, OF JUNCTION CITY, KANSAS.

TRAP.

998,256. Specification of Letters Patent. Patented July 18, 1911.

Application filed February 23, 1911. Serial No. 610,425.

*To all whom it may concern:*

Be it known that I, HARVEY W. MILLER, a citizen of the United States, residing at Junction City, in the county of Geary and State of Kansas, have invented certain new and useful Improvements in Traps, of which the following is a specification.

My invention relates to improvements in traps, and has particular reference to an improved form of trap for catching gophers or other rodents.

The leading object of my invention is the provision of an improved trap for rodents which will securely catch the animal and prevent the escape thereof when the trap is snapped on him.

Another object of the invention is the provision of a combined reinforcing plate and gripping jaw for a gopher trap which will firmly engage the animal when the trap is sprung.

Other objects and advantages of my improved trap will be understood from the following specification taken in connection with the accompanying drawings, forming a part thereof, and it will be seen that I have provided an extremely simple and efficient trap, it being further understood that I may make any modifications in the construction shown within the scope of my claims without departing from or exceeding the spirit of the invention.

Figure 1 represents a side elevation of my trap in set position. Fig. 2 represents a top plan view of the trap in similar position. Fig. 3 represents a bottom plan view thereof, and Fig. 4 represents a longitudinal sectional view of the trap showing the animal caught therein. Fig. 5 is a section on the line 5—5 of Fig. 1, and Fig. 6 is a section on line 6—6 of Fig. 1.

In the drawings, the numeral 1 designates the board forming the base of my trap, said board having the sockets 2 formed therein in which are engaged the depending ends 3 of the arms 4, said arms being secured to the base 1 by the staples 5. These arms extend rearwardly from the center of the board and have formed on their rear ends the outwardly extending helix to provide the spring 6, while extending forward from each helix 6 is an arm 7, the arms of the helices being preferably integral with each other and having the connecting cross bar 8. Formed in the center of the board is the longitudinal slot 9 while passing through the board and transversely of the slot is the pin 10, the bar 11 having an eye 12 pivotally engaged upon said pin 10 and having the enlarged loop 13 formed on its lower end and disposed on the under side of the board and having the hook 14 formed on its upper end and projecting rearwardly.

To lock the arms 7 and the connecting cross bar in depressed position against the tension of the spring 6 I secure centrally of the forward end of the base 1 the U-bar or rod 15 having the eye or loop 16 of the locking member 17 pivotally engaged thereon, said eye depending from the member to support the pivoted end of the member above the surface of the base. In the use of the trap the cross bar 8 is forced downward against the base 1 and the latch member 17 is swung down upon said cross bar and has its hooked end 18 engaged by the hook 14 of the member 11, whereby the cross bar is secured against the base against the tension of the spring 6.

It is a well known fact that traps employing a wooden base having a coiled spring near each edge thereof have a great tendency to split along the center on account of the twisting force exerted by said springs, and further on account of the weakening of the base at its center by the formation of the trigger slot therein and the perforations at the forward end of the base. To counteract this splitting tendency of the base, I secure to the under side thereof the plate 19 bent into substantially U-shape and retained in position by the screws 20. The U-bar 15 having its ends passing through and secured on the under side of the plate, whereby the strain against said member 15 is exerted against the plate and communicated to the entire width of the base instead of but a single point thereon. Extending longitudinally of said plate for the greater portion of the length thereof is the bar 21 having the arms 22 which project upward through the plate and base and have their ends secured to the cross bar 8, whereby when the cross bar 8 is held against the base, the cross bar 21 will be a considerable distance below the under side of the base, while upon the upward movement of the cross bar impelled by the springs 6 the bar 21 will be forcibly jerked into position between the arms of the U-plate, as shown in Fig. 4.

In the use of my trap, I lock the bar 8 against the base as before described, and place suitable bait in the loop 13. I then place the trap as shown in Fig. 1 inclined at an angle and preferably adjacent the entrance to the hole or burrow of the animal, whereby the animal when coming out of the hole will perceive the bait and move under the base 1 toward the bait. As the animal touches the loop 13 in seeking to reach the bait the animal will push the loop 13 slightly to the rear moving the hook 12 out of engagement with the hook 18 of the member 17 when the springs 6 will throw the member 8 upward and thus the arms 22 to bring the bar 21 forcibly against the belly of the animal. The animal will thus be jerked slightly upward and the toothed edges 23 of the U-plate 19 will bite into the back of the rodent to absolutely prevent the same from wriggling loose from the trap when the tension of the springs 6 would otherwise prove insufficient to securely retain the animal.

From the foregoing description the construction and operation of my trap will be readily understood and it will be seen that I have provided an improved trap having a reinforcing plate secured to the under side thereof provided with depending toothed flanges for tightly engaging the animal, said plate thus providing both a reinforcing member, a jaw, and a guide for the arms of the movable jaw member which are drawn upward by the arms of the coiled springs secured to the upper face of the base of the trap.

I claim:

1. A trap, comprising a base having a central slot formed therein, helical springs having a forwardly projecting arm secured to the base on each side of the slot and having an upwardly projecting arm disposed at the side of the base, a connection between the upwardly projecting arms of the springs, a U-plate secured to the under side of the forward end of the base and having its parallel portions depending from the base and formed with serrated edges, a U-shaped member having its base resting between the sides of the U-plate and having its arms projecting upward through the plate and base and secured at their upper ends to the connection between the arms of the springs, and trigger operated means for holding the connection upon the forward end of the base against the tension of the springs.

2. In a trap, the combination with the base, of a plate secured to the under side thereof, said plate having depending flanges provided with serrations forming teeth, a jaw member having arms passing upward through the base and plate and normally lying between the flanges of the plate, means for forcibly moving the jaw upward into said position, and a trigger controlled device for holding said means inoperative.

In testimony whereof I affix my signature, in the presence of two witnesses.

HARVEY W. MILLER.

Witnesses:
ELIZABETH DEIGHAN,
BENJ. H. DUNN.

---

Copies of this patent may be obtained for five cents each, by addressing the "Commissioner of Patents, Washington, D. C."